Figure 3:
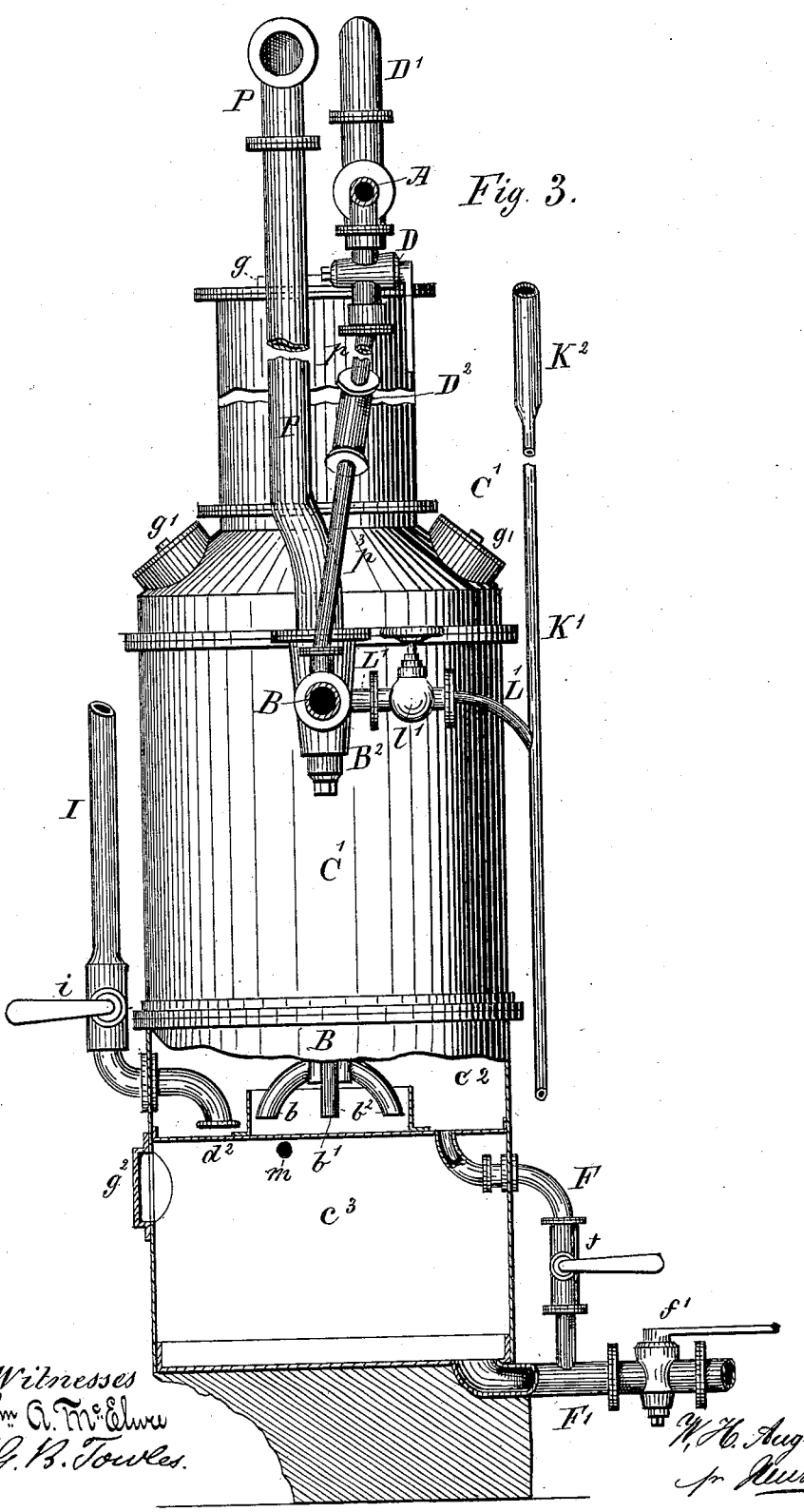

(No Model.)
W. H. A. DEININGER.
PRODUCTION OF SPIRITS OF GREAT PURITY DIRECTLY FROM THE MASH.
No. 266,441. Patented Oct. 24, 1882.
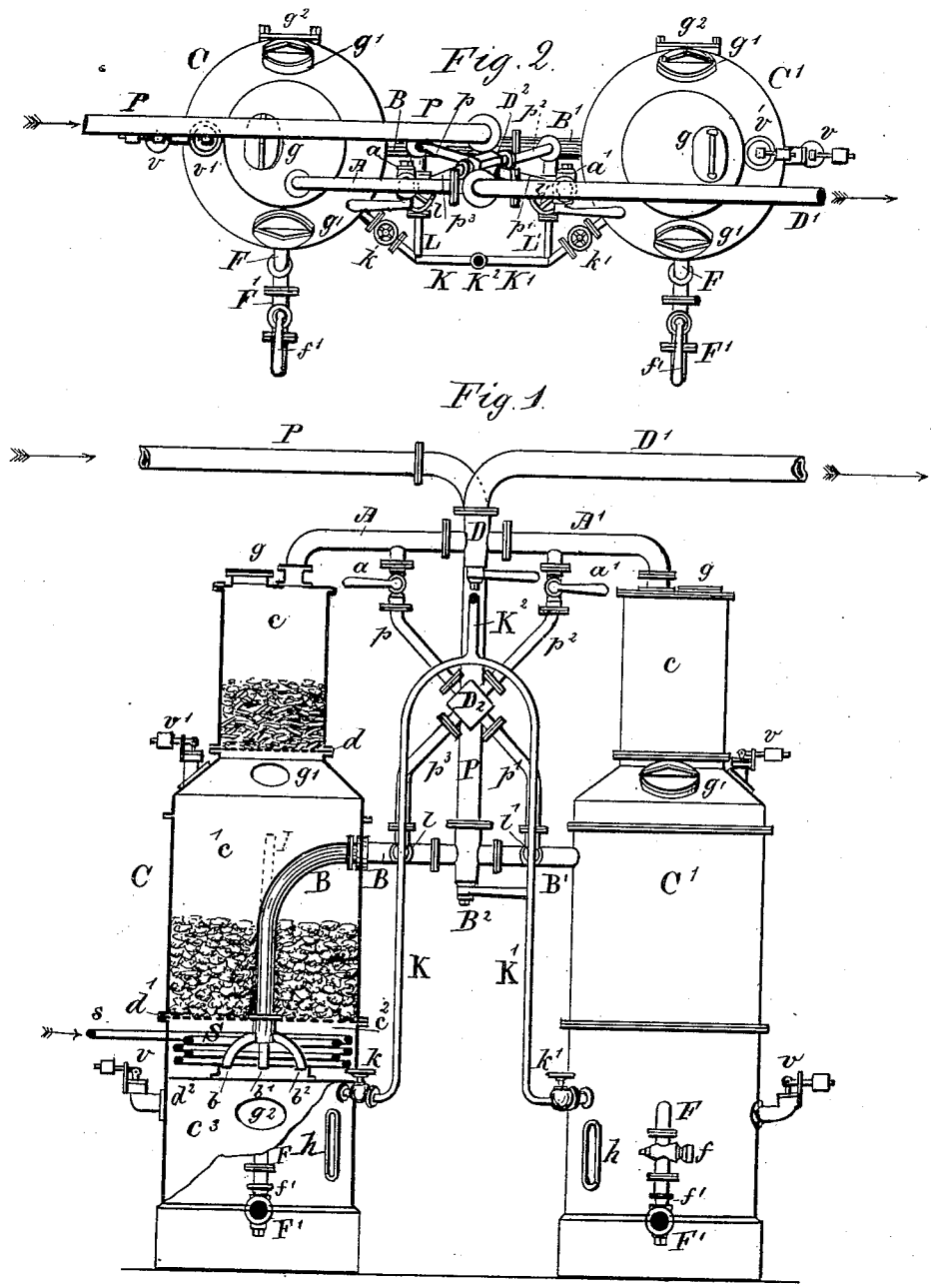

(No Model.) 2 Sheets—Sheet 2.

W. H. A. DEININGER.

PRODUCTION OF SPIRITS OF GREAT PURITY DIRECTLY FROM THE MASH.

No. 266,441. Patented Oct. 24, 1882.

Witnesses
Wm. A. McElwee
G. B. Towles.

Inventor
W. H. August Deininger
pr Henry Orth atty

UNITED STATES PATENT OFFICE.

W. H. AUGUST DEININGER, OF BERLIN, GERMANY.

PRODUCTION OF SPIRITS OF GREAT PURITY DIRECTLY FROM THE MASH.

SPECIFICATION forming part of Letters Patent No. 266,441, dated October 24, 1882.

Application filed April 17, 1882. (No model.) Patented in Germany February 16, 1882; in Belgium March 27, 1882, No. 57,454; in France March 27, 1882, No. 148,104; in Italy March 31, 1882, XXVIII, 68, and XVI, 14,044, and in Sweden June 14, 1882.

*To all whom it may concern:*

Be it known that I, W. H. AUGUST DEININGER, a subject of the King of Prussia, residing at Berlin, German Empire, have invented certain new and useful Improvements in the Production of Spirits of Great Purity Directly from the Mash; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a new method of distilling fine spirits direct from the mash, and to the apparatus employed therefor, as fully described hereinafter, and pointed out in the claims, and shown in the accompanying two sheets of drawings, in which—

Figure 1 is a front elevation, partly in section; Fig. 2, a plan view of so much of a distilling apparatus as is necessary to illustrate my invention. Fig. 3 is a side elevation, partly in section, of one of the rectifying-columns on an enlarged scale.

In carrying out my method of rectification I pass the alcohol vapors as they come from the still first through an alkaline earth chloride, then through charcoal, and I recover the alcohol that condenses and is held by the saturated chloride or the solution of chloride by the direct action of steam upon said chloride or solution of chloride.

I am aware that chloride of calcium has been employed in the distillation of liquors as an absorbent for eliminating the watery vapors and deleterious alcohols from the alcohol vapors by causing the latter to pass through the chloride; and I am further aware that charcoal has long been in use for purposes of rectification. I have found, however, that owing to their absorbent properties not only chloride of calcium, but all the chlorides of the alkaline earths, and more especially the chloride of strontium may be successfully employed as absorbents.

Chloride of calcium, as heretofore employed, presents various inconveniences, due to its liability to pack in a comparatively short time and obstruct the passage of the alcohol vapors. To avoid this, I mix with the alkaline earth chloride, preferably the chloride of strontium, (which, so far as I know, has heretofore never been employed for rectifying purposes,) with a porous body insoluble in water, and alcohol—such as coke or pumice, preferably the latter.

Although I prefer to use the strontium chloride in combination with a porous substance, it may be employed alone and give satisfactory results. The admixture of the porous body and the chloride provides a means whereby the passage of the alcohol vapors through the chloride is greatly facilitated and the watery vapors are more effectually eliminated therefrom, and, further than this, the alcohol that condenses during its passage through the chloride and porous body is more readily taken up by the latter than by the chloride, and its elimination therefrom and recovery is made more easy.

It is well known that fusel-oil, of which amyl alcohol forms a main constituent, vaporizes at a much higher temperature than alcohol, and in order to more readily eliminate the same from the alcohol vapor by causing it to enter into combination with the chloride I heat the combined vapors as they come from the still, and before they reach the chloride, to about 135° Celsius. This may be effected in the rectifying-column below the chamber that contains the chloride or within the chamber itself, or the vapors may be so heated before they reach the column. I prefer to heat these vapors immediately before they ascend through the layer of chloride, as hereinafter fully described. When it becomes necessary to supply the column with fresh chloride, and before the saturated chloride or the chloride solution is removed, I recover the alcohol contained therein by vaporization by the direct action of steam.

In carrying out my process any suitable apparatus may be employed. I have devised an apparatus that not only embodies all the requisite elements for successfully carrying out the said process, but that is constructed with a view to economy in so far as its operation is or may be uninterrupted. In conjunction with my improved rectifying apparatus I employ one or more suitably-constructed stills and condensers. These being so well known, require therefore no further description, nor have I deemed it necessary to illustrate either of them in the drawings.

My improved rectifying apparatus consists of twin rectifying-columns, C C′, both alike in construction and operation, and the description of one of them will therefore suffice for the thorough comprehension of their functions.

Any suitable form may be given to the columns. I make them preferably cylindrical and of varying diameter. The upper portion, $c$, being of smaller diameter than the rest of the column, serves as a receptacle for the charcoal. It has a charging and discharging gate, $g$. This cylinder is seated upon the conical upper end of the column C and separated therefrom by a perforated diaphragm, $d$, upon which the charcoal is placed. The lower part of the column is divided into three chambers, $c'$ $c^2$ $c^3$, by means of the perforated diaphragm $d'$ and the partition-plate or false bottom $d^2$. The chamber $c'$ serves as a receptacle for the chloride of strontium, or other chloride, and the insoluble absorbent substance mixed therewith, which is piled upon diaphragm $d'$, and said chamber has a suitable charging-gate, $g'$, for the introduction of the mixture.

Within the chamber $c^2$, in proximity to the diaphragm $d'$, is located a steam-coil, S, receiving steam from a generator through pipe $s$. The chamber $c^3$ has a man-hole, $g^2$. It is in communication with the chamber $c^2$ through pipes F and F′, the former pipe having a stop-cock, $f$, and the latter pipe a two-way cock, $f'$, by means of which the chloride solution, as it is formed by the absorption of vapors and drops into chamber $c^2$, may be carried to chamber $c^3$ for purposes presently explained.

For inspecting the process of dissolution of the chloride the chamber $c^3$ is provided with a peep-hole, $h$, and it is further provided with a safety-valve, $v$, the chamber $c'$ having a like valve, $v'$, for obvious purposes.

The chamber $c^2$ of each column C C′ has a water-supply pipe, I, (Fig. 3,) provided with stop-cock, $i$, and each chamber $c^3$ of said columns is connected with a steam-pipe, K and K′, branched upon a main supply-pipe, K$^2$, that receives steam from a generator. From the pipes K K′ lead two additional branch pipes, L and L′, that are respectively connected with the branch pipes B and B′ on opposite sides of the three-way cock B$^2$, and said pipes K K′ L L′ are respectively provided with stop-cocks $k$ $k'$ and $l$ $l'$, for purposes hereinafter explained. The vapors from the still pass through pipe P, three-way cock B$^2$, into branch B or B′, and chamber $c^2$ of column C or C′, said pipes B B′ terminating in a multiple discharge composed of a series of small pipes, $b$ $b'$ $b^2$, &c.

The top of each column or chamber $c$ is in communication with a condenser through branch pipes A A′, respectively, the three-way cock D, and the pipe D′, and said pipes A A′ also communicate with the pipes B B′ by means of the cross-coupling D$^2$ and pipes $p$ $p'$ and $p^2$ $p^3$, respectively—that is to say, the pipe A of column C is connected with the pipe B′ of column C′ by means of the pipes $p$ $p'$, and the pipe A′ of column C′ is connected with the pipe B of column C by means of the pipes $p^2$ $p^3$, as shown in Fig. 1, the pipes $p$ $p^2$ being respectively provided with a stop-cock, $a$ and $a'$.

The operation of this rectifying apparatus is continuous, or can be made continuous by alternately connecting the columns with a still, twin stills being preferably employed, so that when the mash in one still is exhausted the other may be ready for operation; and the operation of said rectifying apparatus is as follows, assuming the column C to be the active column for the time being: The three-way cock B$^2$ is set to admit the vapors from the still and pipe P to pipe B and chamber $c^2$ of column C, from whence said vapors pass through the chloride and chamber $c'$, thence through the charcoal and chamber $c$ into pipe A, the three-way cock D being set to allow said rectified vapors to pass into and through pipe D′ to the condenser. During this operation the stop-cocks $i$, $k$ $k'$, $l$ $l'$, $a$ $a'$, and $f$ $f'$ are closed. As the chloride is saturated and liquefied by absorption of the watery vapors it drops into chambers $c^2$. In order to facilitate the elimination of the fusel-oil from the alcohol vapors these are heated, as hereinbefore stated, to about 135° Celsius by means of the steam-coil S, and, if desired, this heating may be effected while the vapors pass through the chloride by providing the chamber $c'$ with a steam-jacket. When so heated the fusel-oil vapors readily separate from the alcohol vapors and enter into combination with the chloride, leaving the alcohol vapors practically free from fusel-oil or other like deleterious vapors, to be further rectified by passing the purified alcohol vapors through the charcoal. When the chloride is saturated or has been liquefied to the extent of becoming inoperative the three-way cocks or valves B$^2$ D are reversed, and the vapors from the still now pass from P through B$^2$ B′ into column C′ and out through pipe A′, three-way valve D, into pipe D′ to the condenser. The saturated chloride and the chloride solution in column C contains, however, a certain proportion of alcohol which would be lost if no provision were made for its recovery before the chloride is again solidified for further use. This recovery I effect in the following manner: As soon as the admission of alcohol vapors from the still to column C and from the latter to the condenser is cut off by the reversal of the valves B$^2$ D the stop-cocks $a$ and $l$ are opened. Steam is now admitted by the latter from pipe K into pipe B and chamber $c^2$, where the alcohol contained in the chloride solution is vaporized. By the reversal of the valve D these vapors cannot pass to the condenser. The stop-cock $a$, however, being open said vapors pass through pipe $p$, cross-coupling $D^2$, and pipe $p^3$ into pipe $B'$ and chamber $c^2$ of column $C'$, and, mingling with the vapors coming from the still, they pass with said vapors through the column to the condenser, as above set forth. When the alcohol has been eliminated from the chloride solution the stop-cocks $f f'$ on pipes F F' are opened and the solution run into the evaporating-pans, to be evaporated for further use. By means of the pipe I water, under pressure, may be admitted to chamber $c^2$ to remove any calcium that may remain therein.

Under some circumstances it may not be desirable to pass the alcohol vapors recovered from the chlorides in one column directly into the other column. In this case the chloride, as it is liquefied, is allowed to flow into chamber $c^3$, the stop-cock $k$ being then opened and steam admitted from K to chamber $c^3$ to vaporize the alcohol in the solution, the vapors being conducted directly from said chamber into the mash-column of the still through pipe $m$, after which the calcium solution is run off through pipe F' by reversing the stop-cock $f'$, and is evaporated for further use, as above set forth. The chamber $c^3$ may also be provided with a steam-jacket for the purpose of vaporizing the alcohol in the chloride solution. After the removal of the chloride solution, (the steam being then cut off from column C, except that passing through coil S,) the chamber $c'$ is again charged with fresh chloride, and said column is ready for operation as soon as the chloride in column $C'$ becomes inoperative, when the operation of the latter is stopped, and so on continually.

What I claim as new is—

1. In the process of obtaining fine spirits directly from the mash, the method of rectifying the crude spirits resulting from the distillation, which consists in passing the vapors generated in the still first through a layer of chloride of strontium and a porous material and then through charcoal, as and for the purposes specified.

2. In the process of obtaining fine spirits directly from the mash, the method of rectifying the crude spirits resulting from the distillation and facilitating the elimination of the deleterious alcohols, which consists in heating the vapors from the still to about 135° Celsius, and then passing the so heated vapors first through a layer of an alkaline chloride and then through charcoal, as and for the purpose specified.

3. The process of obtaining fine spirits directly from the mash and recovering the alcohol from the absorbents, which consists in passing the vapors generated in the still first through a layer composed of a chloride of alkaline earth and then through charcoal, and, after saturation of the absorbents, subjecting the same to the direct action of steam, substantially as and for the purposes set forth.

4. The rectifying apparatus consisting of the columns C C', pipes B B', three-way valve $B^2$, and pipe P, whereby the vapors from the still may be passed to either one of the columns by manipulating the valve $B^2$, substantially as and for the purposes shown and described.

5. The combination, with the pipes A A' B B' and the columns C C', of the pipes $p\ p'\ p^2\ p^3$, provided with suitable stop-cocks or valves, whereby the vapors issuing from the top of either column may be conducted to the lower part of the other column, substantially as and for the purposes specified.

6. In a rectifying apparatus, a rectifying-column having chambers $c$, $c'$, and $c^2$, in combination with the steam-coil S, located within chamber $c^2$, and a spray or current-dividing pipe located within the coil S and connected with the still, whereby the vapors issuing from the spray-pipe are superheated before being passed through the rectifying-chambers $c\ c'$, substantially as and for the purposes specified.

7. A rectifying apparatus constructed for continuous operation and recovery of absorbed alcohol, composed of two rectifying-columns, C C', having chambers $c\ c'\ c^2\ c^3$, in combination with valved pipes arranged to operate, as set forth, whereby said columns may be connected independently of each other with a still, a condenser, a steam-generator, a source of water-supply, and with each other for conducting the vapors from one into the other, whereby the several steps of the process hereinbefore described may be carried out in continuity, substantially as and for the purposes set forth.

In testimony whereof I affix my signature in presence of two witnesses.

W. H. AUGUST DEININGER.

Witnesses:
ADOLF DEMCLIUS,
B. ROI.